July 5, 1966 K. W. TANTLINGER ETAL 3,259,400
SEMI-TRAILER APPARATUS FOR VEHICULARIZING CONTAINERS
Filed April 1, 1964 3 Sheets-Sheet 1
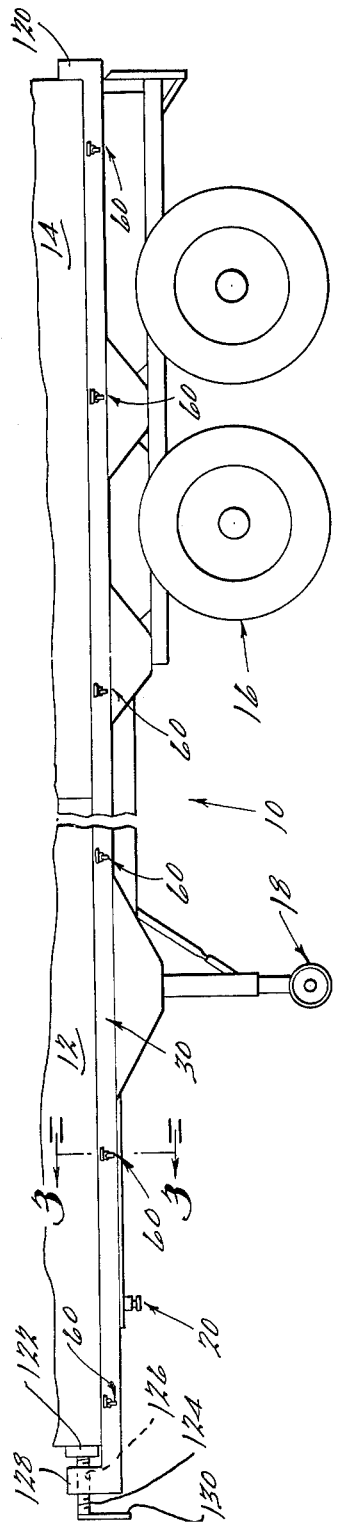
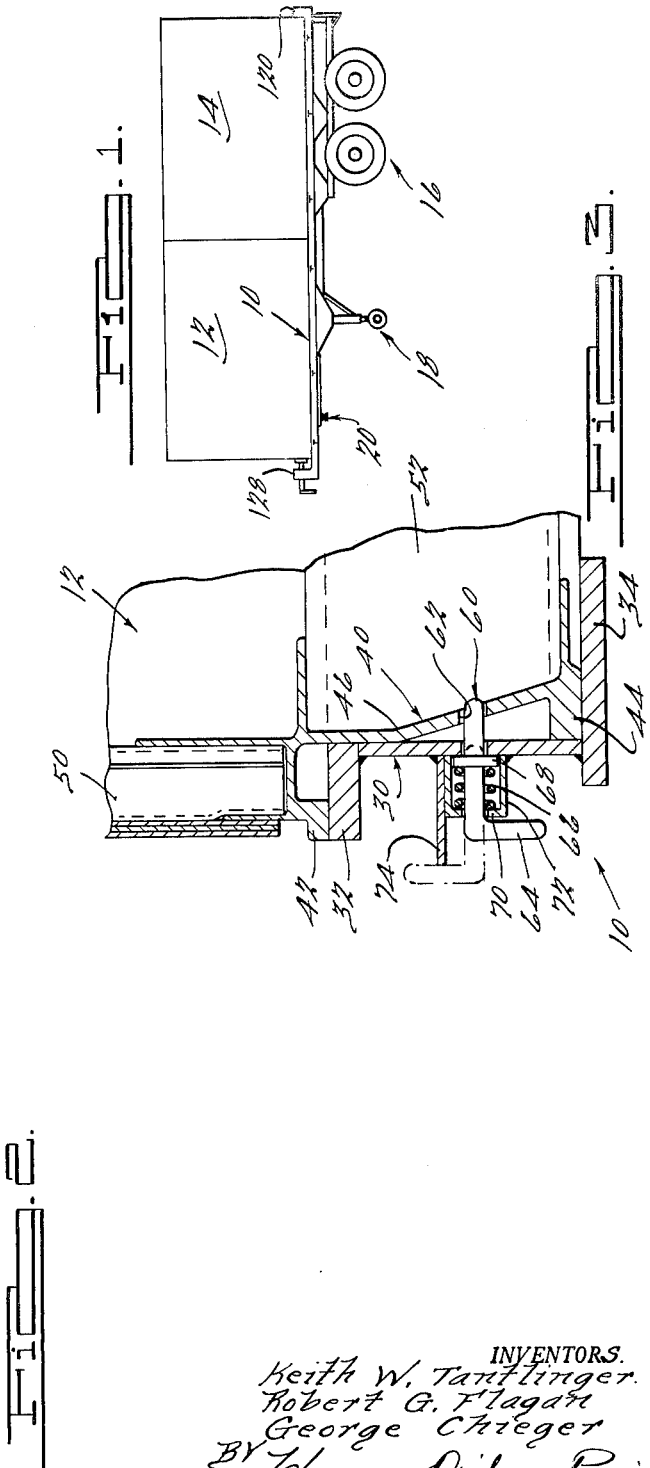
INVENTORS.
Keith W. Tantlinger.
Robert G. Flagan
George Chieger
BY Harness, Dickey & Pierce
ATTORNEYS.

July 5, 1966  K. W. TANTLINGER ETAL  3,259,400
SEMI-TRAILER APPARATUS FOR VEHICULARIZING CONTAINERS
Filed April 1, 1964  3 Sheets-Sheet 2

INVENTORS.
Keith W. Tantlinger.
Robert G. Flagan.
George Chieger.
BY Harness, Dickey & Pierce
ATTORNEYS.

July 5, 1966 K. W. TANTLINGER ETAL 3,259,400
SEMI-TRAILER APPARATUS FOR VEHICULARIZING CONTAINERS
Filed April 1, 1964 3 Sheets-Sheet 3

INVENTORS.
Keith W. Tantlinger.
Robert G. Flagan
BY George Chieger
Harness, Dickey & Pierce
ATTORNEYS.

United States Patent Office 3,259,400
Patented July 5, 1966

3,259,400
SEMI-TRAILER APPARATUS FOR VEHICU-
LARIZING CONTAINERS
Keith W. Tantlinger, Grosse Pointe Shores, Robert G.
Flagan, Grosse Pointe Park, and George Chieger,
Birmingham, Mich., assignors to Fruehauf Corpora-
tion, Detroit, Mich., a corporation of Michigan
Filed Apr. 1, 1964, Ser. No. 356,529
2 Claims. (Cl. 280—423)

This invention relates generally to wheeled vehicles and more particularly to an improved apparatus for vehicularizing shipping containers.

Use of the modern structurally self sufficient shipping container has created the need for an entirely new concept in wheeled vehicles for handling such shipping containers. Vehicles heretofore known and used are, in general, designed to mount a payload on a relatively heavy frame or within a van mounted on the frame of the vehicle. Thus, the bed or frame of the vehicle must of necessity be relatively strong. However, because the modern shipping container is structurally self sufficient, it requires only a relatively light frame or wheel suspension in addition to a means for transmitting tractive effort thereto, to be conditioned for highway travel.

Apparatus for vehicularizing containers, in accordance with one exemplary embodiment of the instant invention, comprises a relatively light chassis having provision for the acceptance of two or more shipping containers in nested relationship. The chassis has means for locking the containers in said nested relationship whereby the strength of the shipping containers is utilized to satisfy the strength of the chassis, thereby reducing the cost of the chassis by minimizing the strength requirements thereof.

In another embodiment, only a wheel suspension and kingpin platform are provided to vehicularize a container. The wheel suspension splits to function as a front support in one condition.

Accordingly, one object of the present invention is improved apparatus for vehicularizing a container.

Another object is an improved chassis for the support of a plurality of shipping containers.

Another object is an improved chassis wherein a pair of shipping containers are supported in stress transfer relationship.

Another object is an apparatus for vehicularizing a shipping container comprising a wheel suspension and a kingpin platform.

Another object is a dual axle wheel suspension that splits to form the front support for a shipping container.

Other objects and advantages of the present invention will be apparent from the following specification, claims and drawings, wherein:

FIGURE 1 is a side elevational view of a pair of shipping containers mounted on a chassis in accordance with one embodiment of the instant invention;

FIG. 2 is an enlarged fragmentary view of the frame portion of the chassis of FIGURE 1;

FIG. 3 is a cross sectional view taken substantially along the line 3—3 of FIG. 2;

Figure 4:
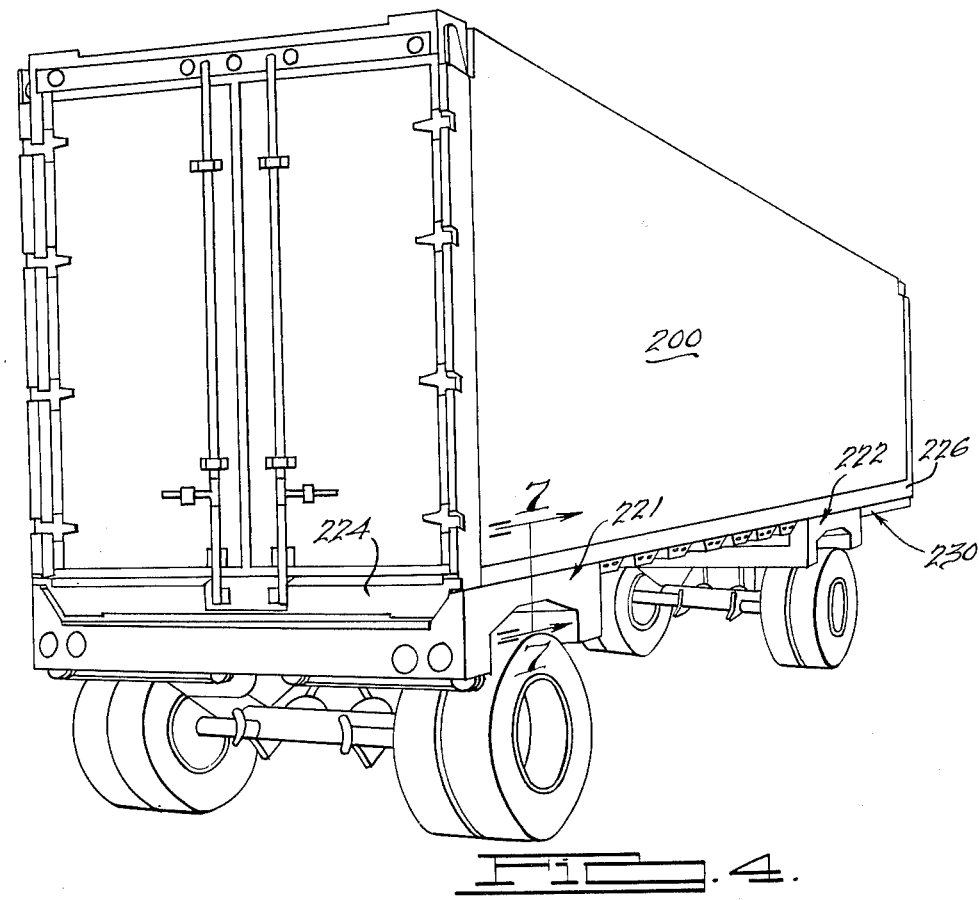
FIG. 4 is a perspective view of another embodiment of the instant invention with the wheel suspension split to function as a front support.

Referring to FIGURE 1 of the drawings, a relatively light spaced frame chassis 10, in accordance with an exemplary embodiment of the instant invention, is shown in operative association with a pair of shipping containers 12 and 14. The frame 10 is provided with a wheel suspension 16, landing gear 18, and kingpin 20 to provide for highway travel thereof.

As best seen in FIG. 3 of the drawings, the chassis 10 comprises longitudinal frame members 30 on opposite sides thereof, one of which is shown, having an upper outwardly extending flange 32 and a lower inwardly extending flange 34. The chassis 10 is of relatively light construction since it utilizes the strength of the shipping containers 12 and 14, as will be described.

The shipping container 12 has longitudinally extending lower rail portions 40 on opposite sides thereof, one of which is shown, having an upper flange 42 adapted to seat on the upper flange 32 of the frame member 30. The rail 40 has a lower flange 44 adapted to seat on the lower plate 34 of the frame member 30. Flanges 42 and 44 are connected by an upwardly extending web portion 46.

The container 12 is provided with suitable posts 50 and transverse lateral members 52 thereby to form a relatively strong, generally rectangular cubicle. It is to be noted that a plane defined by the lowermost components of the shipping container 12, namely, the flanges 44 on the rails 40, are spaced well below the plane of the upper plate 32 on the frame member 30, thereby to minimize the overall height of the chassis 10 and shipping container 12. It is also to be noted that the nested relation of the rail 40 and frame member 30 precludes lateral movement of the shipping container 12 with respect to the frame 30.

In accordance with one feature of the present invention a locking pin 60 extends through a complementary longitudinally elongated slot 62 in the web portion 46 of the rail 40 to positively secure the shipping container 12 relative to the frame member 30 of the chassis 10. The pin 60 is of generally L-shaped configuration, an outer end portion 64 thereof functioning as a handle to provide for manual retraction thereof. The pin 60 is normally biased inwardly to a locked position by a helical compression spring 66 that extends between a flange 68 on the pin 60 and an outer end portion 70 of a spring retainer sleeve 72. A plate 74 overlies the sleeve 72 to provide for engagement of the outer end portion 64 of the pin 60 upon retraction thereof thereby to hold the bar 60 in the retracted position.

In accordance with yet another feature of the present invention and, as best seen in FIG. 2 of the drawings, the strength of the shipping containers 12 and 14 is utilized to minimize the strength requirement of the chassis 10. In accordance with the instant invention, the rearward shipping container 14 is biased against a stop 120 on the chassis 10 and the forward shipping container 12 is biased against the rearward shipping container 14 by a pressure plate 122 that is advanceable rearwardly of the chassis 10 as by a screw 124. The screw 124 is threadably engaged in a complementary threaded aperture 126 in a transverse frontal plane 128. Rotation of the screw 124 is facilitated by a hand crank 130.

Thus, it will be appreciated that upon tightening of the screw 124 to bias the containers 12 and 14 against one another and against the rear stop 120, the containers are compressively loaded. The slots 62 in the web portion 46 of the rails 40 accommodate the relatively small amount of relative longitudinal movement between the containers 12 and 14 and the chassis 10 necessary to effect such compressive loading. Thus, deflection or bowing of the chassis 10, due to the weight of the shipping containers is resisted by engagement of the shipping containers 12 and 14 with one another at the confronting faces thereof.

As seen in FIGURES 4 through 7 of the drawings, another embodiment of the apparatus for vehicularizing a shipping container eliminates the rails 40 of the embodiment described hereinbefore. A container 200 has a plurality of laterally extending longitudinally spaced bolsters 202 that underlie the container 200 and extend between a pair of longitudinally extending lower edge rails 204 and 206 on opposite sides thereof. The bolsters 202 have a pair of apertures 208 and 210 therein, respectively, for the acceptance of a suitable locking mechanism, to be described. The bolsters have angularly downwardly extending end faces 212 and 216, at opposite ends thereof, respectively, for seating on complementary end faces or seats 219 and 220, respectively, on a pair of wheel suspension frames 221 and 222.

As best seen in FIGURE 4 the wheel suspension frame 221 is positionable at a rear end 224 of the container 200. Similarly, the wheel suspension frame 222 is positionable at a forward end portion 226 of the container 200 to function as a front support when the container 200 is stored at, for example, a loading dock or the like.

Figure 5:
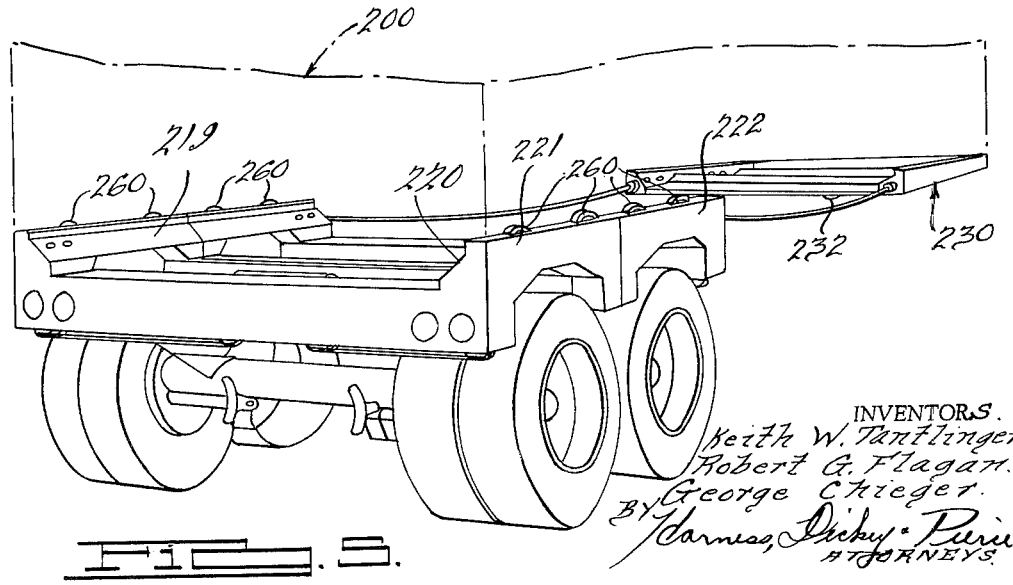
FIG. 5 is a view similar to FIG. 4 with the wheel suspension and kingpin in the over-the-road condition and with the rolls thereof elevated.
Figure 6:
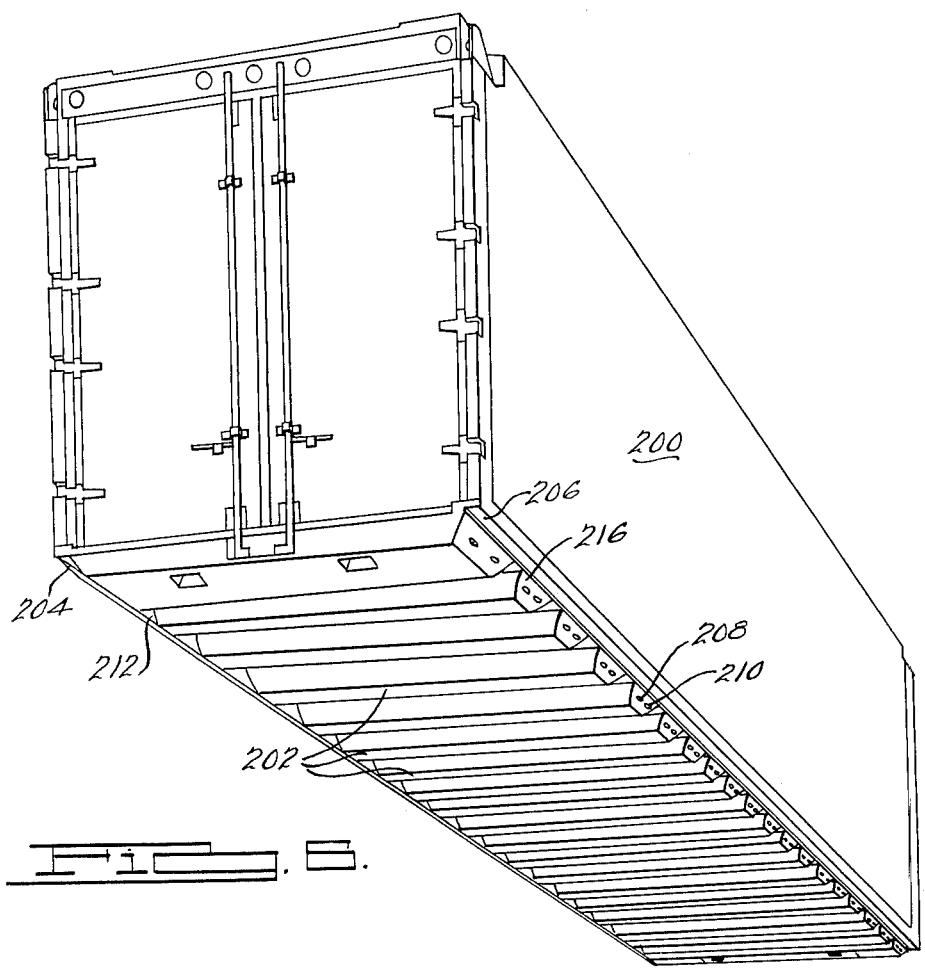
FIG. 6 is a perspective view of the container of FIG. 4 removed from the wheel suspension.

As best seen in FIG. 5 of the drawings, the wheel suspensions 221 and 222 are moveable into juxtaposed relation to form a tandem wheel suspension for the container 200 for over-the-road use. When the wheel suspensions 221 and 222 are in the tandem condition, a kingpin support frame 230 is secured to the underside of the container 200 for the support of a downwardly depending kingpin 232.

Figure 7:
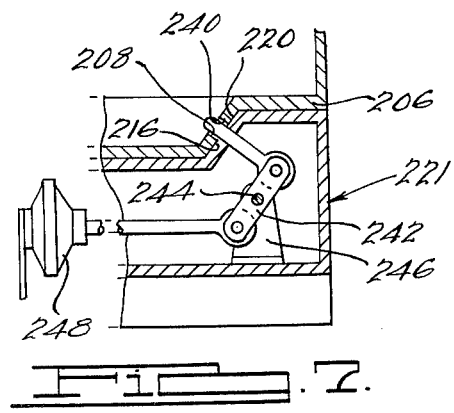
FIG. 7 is a cross sectional view taken substantially along the line 7—7 of FIG. 4.

Both the wheel suspension frames 221 and 222 and the kingpin support frame 230 are secured to the container 200 by a pin and retraction mechanism comprising, as best seen in FIG. 7 of the drawings, a retractable pin 240 that is pivotally coupled to a bellcrank 242. The bellcrank 242 is supported for rotation by a pin 244 on a support 246. The bellcrank 242 is rotated about the pin 244 upon actuation of an air cylinder 248. Both of the wheel suspension frames 220 and 222 and kingpin support frame 230 are provided with like retracting mechanisms on opposite sides thereof. The pins 204 are accepted in the complementary elongated apertures 208 and 210 in the bolsters 202.

As best seen in FIG. 5 of the drawings, the wheel suspension frames 220 and 232 are provided with rolls 260 which are elevatable into contact with the rails 204 and 206 of the container 200 to facilitate relative movement of the wheel suspensions longitudinally of the container 200. The rolls are elevatable as by a mechanism disclosed in application Serial No. 315,053 filed October 9, 1963 for Trailer Suspension Construction and assigned to the asignee of the instant invention and now abandoned.

From the foregoing description it should be apparent that the apparatus for vehicularizing a shipping container in accordance with the instant invention eliminates the heretofore required heavy chassis. One embodiment of the invention utilizes relatively light frame members which in turn have a means thereon for biasing a pair of containers against one another so as to utilize the containers to rigidify the chassis. This is accomplished by biasing the lower portions of the containers against one another to preclude separation thereof if the central portion of the chassis deflects downwardly due to load. By retaining the lower portions in abutting relationship as by a screw mechanism, buckling of the containers relative to one another is precluded and the rigidity thereof augments the strength of the chassis. It is also to be noted that the frame members are loaded in tension as opposed to being subjected only to a bending moment.

The containers are secured to the relatively light chassis by a relatively simple pin mechanism which need serve only to retain the containers against vertical movement relative to the chassis, relative longitudinal movement being precluded by the screw mechanism and relative lateral movement being precluded by the fact that the containers are seated between the frame members of the chassis.

In another embodiment of the instant invention the frame members are entirely eliminated. A kingpin support platform is secured to the front end of a shipping container and a pair of wheel suspensions are secured to the rear end thereof by a suitable locking pin assembly. Tractive effort is transmitted to a kingpin thence through the container to a pair of wheel suspensions at the rear end thereof. The wheel suspensions are separable, one of the suspensions functioning as a front support for the container when it is in a loading or storage condition.

It is to be understood that the specific construction of the improved apparatus herein disclosed and described is presented for the purpose of explanation and illustration and is not intended to indicate limits of the invention, the scope of which is defined by the following claims.

What is claimed is:
1. Apparatus for vehicularizing a pair of shipping containers comprising
    a frame
    means on said frame for seating containers,
    stop means at one end of said frame engageable with one of the shipping containers,
    means at the other end of said frame for biasing the other of the containers against said one container and stop means in compressively loaded relationship so as to resist bowing of said frame, and
    a wheel suspension at the one end of said frame including a pair of ground-engaging wheels and a downwardly depending kingpin at the other end of said frame for transmitting tractive effort thereto.

2. Apparatus for vehicularizing an elongated shipping container having longitudinally and downwardly extending rail portions thereon comprising spaced parallel
    frame means underlying and vertically aligned with the longitudinal side walls of said container for accepting the rails of said container in nesting relationship, therebetween,
    a downwardly depending kingpin at one end of said frame means for transmitting tractive effort thereto,
    locking means on said frame means engageable with the rails of said shipping container for securing said containers thereto, and
    a wheel suspension at the other end of said frame means, said frame means extending the full length of said shipping container.

References Cited by the Examiner

UNITED STATES PATENTS

| | | | |
|---|---|---|---|
| 2,097,113 | 10/1937 | Bradley | 280—5 |
| 2,876,016 | 3/1959 | McClellan | 296—35 X |
| 2,981,210 | 4/1961 | Krueger | 105—368 |
| 3,085,707 | 4/1963 | Tantlinger | 220—1.5 |

LEO FRIAGLIA, *Primary Examiner.*